(No Model.)
W. TODD.
LOOM SHUTTLE.
No. 568,929. Patented Oct. 6, 1896.
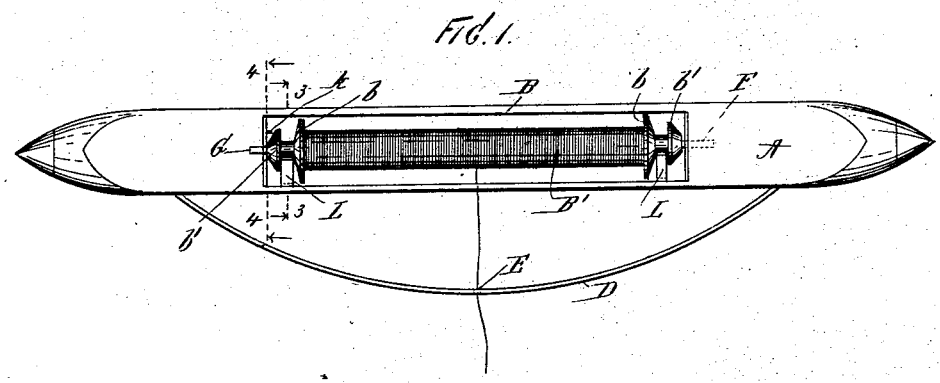
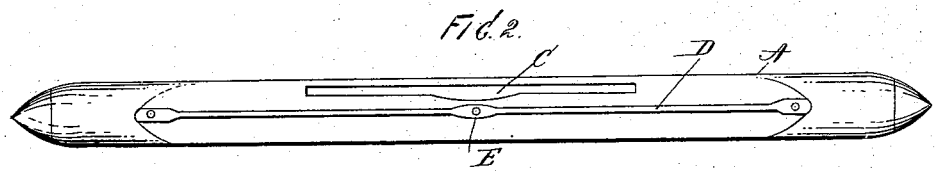
 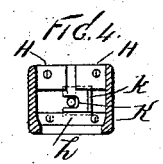
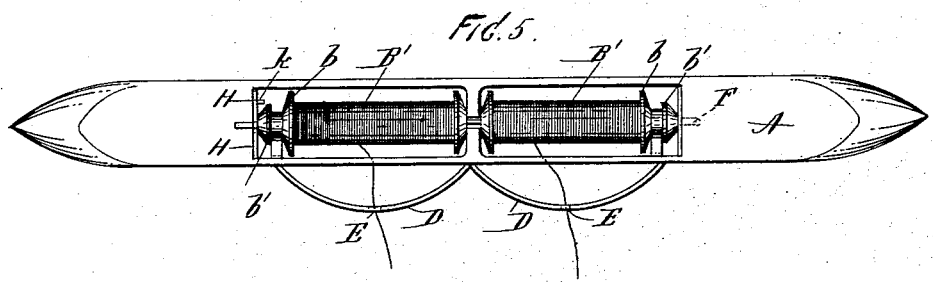
WITNESSES:
John Buckler,
C. Gerst
INVENTOR
Walter Todd,
BY
Edgar Tate & Co
ATTORNEYS.

UNITED STATES PATENT OFFICE.

WALTER TODD, OF PATERSON, NEW JERSEY.

LOOM-SHUTTLE.

SPECIFICATION forming part of Letters Patent No. 568,929, dated October 6, 1896.

Application filed September 20, 1895. Serial No. 563,125. (No model.)

*To all whom it may concern:*

Be it known that I, WALTER TODD, a citizen of the United States, and a resident of Paterson, in the county of Passaic and State of New Jersey, have invented certain new and useful Improvements in Loom-Shuttles, of which the following is a specification, reference being had to the accompanying drawings, forming a part thereof, in which similar letters of reference indicate corresponding parts.

This invention relates to shuttles such as are usually employed in silk and other looms, and the object thereof is to provide a simple and effective tension device whereby I dispense with the complicated and expensive tension devices now in use; and with this and other objects in view the invention consists of the construction, combination, and arrangement of parts hereinafter described and claimed.

In the accompanying drawings, forming a part of this application, Figure 1 is a plan view of my improved shuttle, showing also a reel or spool in position thereon, on which is wound the usual silk or other thread or yarn. Fig. 2 is a side view of the shuttle; Fig. 3, a section on the line 3 3 of Fig. 1; Fig. 4, a section on the line 4 4, and Fig. 5 is a plan view of a modified form of construction.

Referring to the drawings, A represents a shuttle of the usual form provided with a longitudinal chamber B in the top thereof and longitudinal slot C in one side, and secured to the side of the shuttle in which the slot C is formed is an outwardly-curved wire or rod D, in which is formed a perforation E.

At one end of the longitudinal chamber B is formed a small central hole or bore F, adapted to receive one end of a shaft or rod which passes through the reel or spool B', and at the other end is formed a vertical slot G, which extends to about the middle of the end of the chamber B, and at the top of the end of the chamber and secured to the end wall thereof are plates H, which are separated by a space equal to the width of said slot, and below said slot is a transverse plate *h*, and between these plates is a sliding plate K, having a groove or recess in the inner end thereof, and the outer end of which is outwardly curved, as shown at K, forming a projection by means of which said sliding plate may be operated.

The reel or spool B' is provided at each end with main heads *b*, and with supplemental heads is placed a spring L, one end of which is secured to the side wall of the longitudinal chamber B, and the other end of which is adapted to bear upon the spool between the supplemental heads, as clearly shown in Fig. 1.

In placing the reel or spool in position one end of the central shaft thereof is inserted into the hole or bore F, and the other end is dropped down into position through the vertical slot G, after which the sliding plate K is moved forward, so that the slot or recess in the end thereof incloses the shaft or rod of the spool or shuttle and prevents the removal thereof, as shown in Fig. 4.

In the construction shown in Fig. 5 I employ two of the shuttles or spools B' and two of the outwardly-curved wires or rods D, as clearly shown in said figure, and the longitudinal chamber B, in which the spools or shuttles are placed, is provided with a central partition, by which said chamber is divided into two equal compartments.

In practice the thread or yarn of the spool is passed through the perforation or opening E in the outwardly-curved wire or rod D, and the operation will be readily understood in view of the foregoing description when taken in connection with the accompanying drawings, said operation being exactly the same as with other devices of this class now in use.

The springs L constitute my improved tension device and are so formed and arranged as to bear upon the spool or reel with just sufficient force to provide the proper tension and prevent the too free movement of the spool or reel, and the object of the supplemental heads *b'* is to hold the spool or reel in place and prevent the longitudinal movement thereof.

Having fully described my invention, I claim and desire to secure by Letters Patent—

A loom-shuttle, provided with a chamber in the upper side thereof, a shaft or rod in said chamber and adapted to support a spool, a hole in the said shuttle at one end of the chamber and a slot at the opposite end thereof, springs secured to the side walls of the said chamber and adapted to impinge against the spool, a sliding plate at the end of said chamber adjacent to said slot and provided with a notch or recess, and a thread-guide secured to said shuttle, substantially as described.

In testimony that I claim the foregoing as my invention I have signed my name, in presence of the subscribing witnesses, this 19th day of September, 1895.

WALTER TODD.

Witnesses:
C. GERST,
M. A. KNOWLES.